Figure 3:
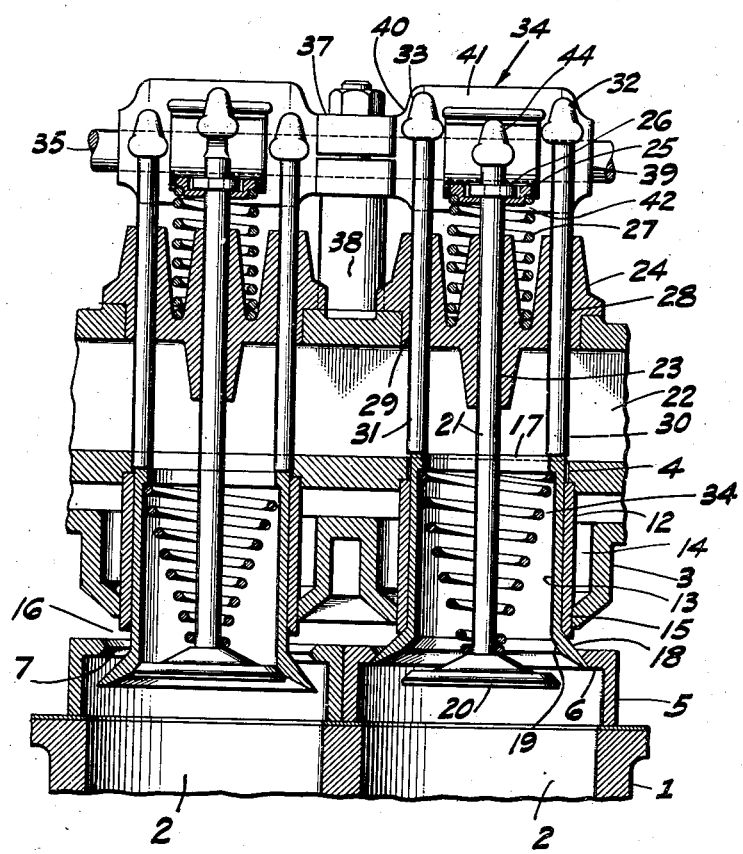

Dec. 1, 1942.                    C. P. BRUMBY                    2,303,324
                VALVE MECHANISM FOR INTERNAL COMBUSTION ENGINES
                         Filed Aug. 12, 1941           2 Sheets-Sheet 1
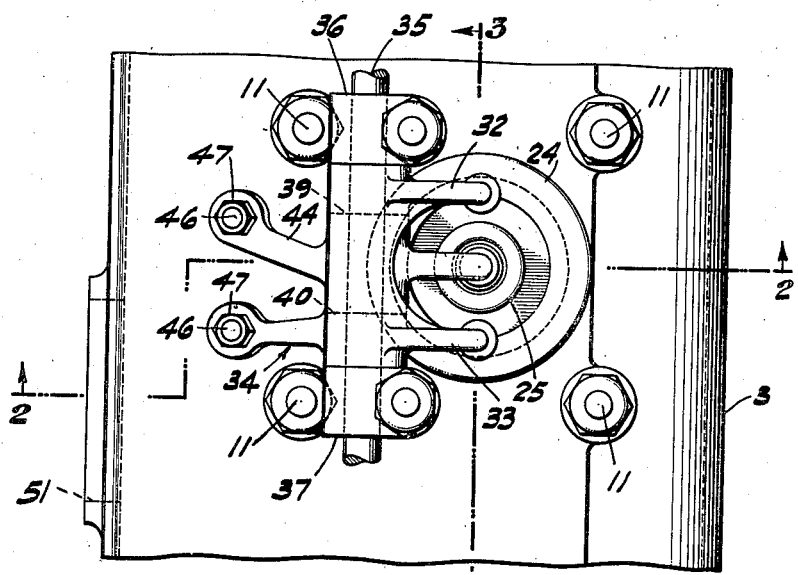
Fig. 1.
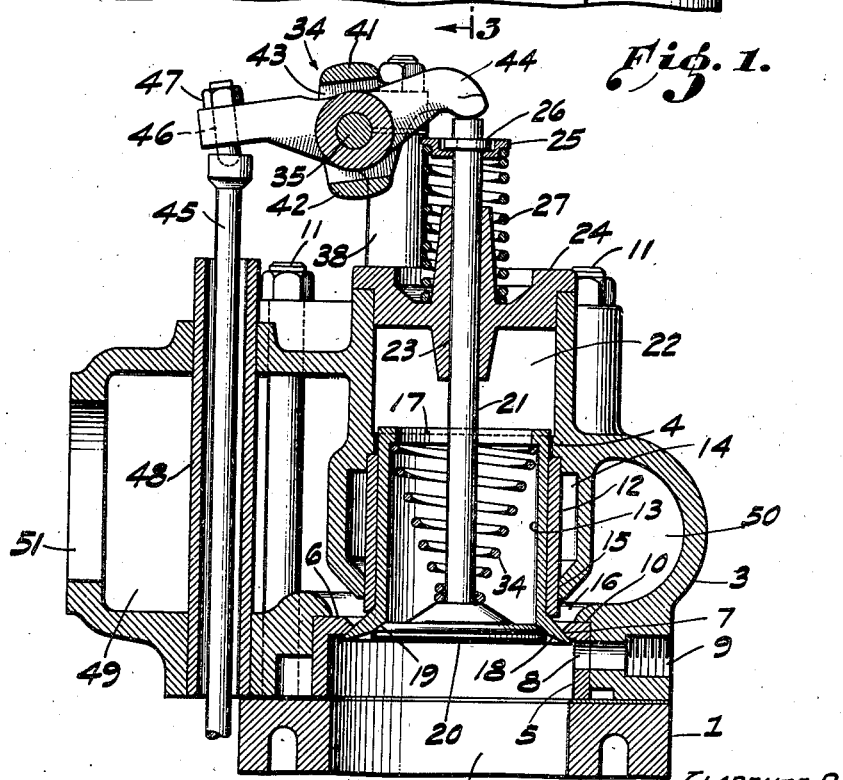
Fig. 2.
CLARENCE P. BRUMBY,
       INVENTOR.
ATTORNEY.

Patented Dec. 1, 1942

2,303,324

UNITED STATES PATENT OFFICE 2,303,324

VALVE MECHANISM FOR INTERNAL COMBUSTION ENGINES

Clarence P. Brumby, Los Angeles, Calif.

Application August 12, 1941, Serial No. 406,514

5 Claims. (Cl. 123—79)

This invention relates to internal combustion engines.

Among the more important objects of the invention is to provide an internal combustion engine having an improved combustion chamber formed of an independent part interposable between the cylinder block and the cylinder head and locked in position when the said block and head are bolted together; to provide an improved detachable part, including an exhaust valve seat, which in combination with the piston head on one side and the exhaust and inlet valves on the opposite side form an explosion chamber in which all the forces of the explosion are confined directly upon the piston without restricted passages; to provide an improved downdraft intake of large area with a minimum of turns and obstructions and consequent minimized frictional resistance; to provide an improved valve mechanism which will give maximum valve opening areas with minimum valve lift, and which at high speed prevents valve flutter or the inability of spring action to properly seat the valve in its proper cycle; and to provide an exhaust passage of large area, allowing the burned gases to escape into a comparatively large chamber through a passage continuous around the circumference of the exhaust valve.

A further object of the invention is to provide an improved exhaust valve operating mechanism.

More specifically speaking, a still further object of the invention is to provide in an internal combustion engine an improved combustion chamber detachably mounted between the cylinder block and head having a shape conformed to the cylinder wall and forming a continuation thereof together with the exhaust valve and inlet valve forming the dome and the piston head the base of a chamber in which the compression and explosion of the gases take place, thereby making possible an advantageous choice of materials according to strength, lightness and wear, for the various parts comprising the cylinder block, cylinder head and auxiliary parts entering into the combination.

With the foregoing and still other objects in view, the invention resides in the novel arrangement and combination of parts and in the details of construction hereinafter described and claimed, it being understood that changes in the precise embodiment of the invention herein disclosed may be made within due scope of the subject matter claimed, without departing from the spirit of the invention.

Referring to the drawings, wherein is shown a preferred embodiment of the invention as now reduced to practice and undergoing tests, Fig. 1 is a fragmentary plan view showing one of the valves together with its operating mechanism, Fig. 2 is a vertical section taken on the plane indicated by the line 2—2 of Fig. 1, and, Fig. 3 is a fragmentary, longitudinally extending, vertical cross section through the device, the plane of section being indicated by the line 3—3 of Fig. 1.

In the drawings 1 represents the cylinder block including the piston cylinder 2, and 3 the cylinder head including the valve chamber 4, between which is interposed in an operative relation to said piston cylinder and valve chamber the combustion chamber member 5. Said chamber member 5 is surrounded by an annular member provided with an inwardly directed peripheral flange 6 at one end which in the present instance is considered the member's top side. In the interior face of the upper part of said member 5 is formed an inwardly and downwardly directed annular seat 7. Said member 5 is also provided with a side opening 8 which is adapted to register with a tapped hole 9 located in the head 3 for the reception of a spark plug.

Since the member 5 is an independent and detachable part, the advantage is presented of constructing it out of high strength steel or other metals or alloys capable of withstanding high compression ratios, while permitting the use of lighter metals such as aluminum or aluminum alloys for the cylinder head, which has only exhaust gases and water pressure to withstand.

The internal diameter of the member 5 is preferably constructed equal to or greater than the piston cylinder diameter which it overlies and of which it forms a continuation, and a portion of its top together with its sides is nested within an annular shoulder 10 with which the head 3 is provided, so that when the aforesaid block and head are operatively joined together by means of bolts 11, the member 5 will be maintained immovably in position.

Into the head 3 is pressed a tubular sleeve 12 and in said sleeve is slidably mounted the exhaust valve 13, the outer surface of the sleeve 12 sealing the water jacket 14 that surrounds each valve chamber.

The lower end of the sleeve 12 projects a sufficient distance below the lower opening 15 of the valve chamber 4 to form in conjunction with the peripheral opening in the flange 6 an annular angularly directed exhaust port 16 through which the burned gases escape from the combustion chamber.

The exhaust valve 13 comprises an annular member provided at its upper end (fuel intake) with an inwardly directed peripheral flange 17 and at the lower end (fuel discharge) with an outwardly directed peripheral flange 18, the under side of the latter flange having formed therein an annular seat 19 of conventional design for the inlet valve 20, the peripheral edge of the upper face of said flange 18 being adapted to underlie and rest against the seat 7 when the exhaust valve is in the closed position.

The stem 21 of the intake valve 20 extends through the suction passage 22 and the valve guide opening 23 in the bearing 24 and carries at its upper end a spring retainer 25 and keeper 26. Between said retainer and bearing, coiled about said guide, is a helical valve spring 27 of conventional design which is used to maintain the intake valve 20 and the exhaust valve 13 in the closed position shown in Fig. 2, except when acted upon by the rocker arms as explained later.

In addition to the valve guide opening 23 in the bearing 24 for the valve stem 21, the bearing 24 is provided with two similar guide openings 28 and 29 as shown in Fig. 3, through which extend the plunger rods 30 and 31 adapted to open the exhaust valve 13 when acted upon by the pairs of fingers 32 and 33 of the rocker arm 34 with which the upper ends of said plunger rods are operatively related. The lower ends of the plunger rods contact with the upper surface of the flange 17 of the exhaust valve and they are spaced diametrically opposite each other to obtain a uniform opening of the exhaust valve and also prevent it from locking in the cylindrical chamber through which it operates.

The inwardly directed flange 17 of the exhaust valve forms with the internal annular wall of the valve a seat for the large end of a cone shaped spiral spring 34, said spring being coiled about the stem 21 of the intake valve 20 and with its apical portion resting against the valve proper at its juncture with its stem. Spring 34 acts in opposition to the plunger rods 30 and 31 to maintain the exhaust valve closed when unacted upon thereby.

As seen particularly in Figs. 1 and 2, a rocker arm shaft 35 mounted in bearings 36 and 37 provided on the pedestals 38 support the spaced apart apertured shanks 39 and 40 from which extend the fingers 32 and 33 of the rocker arm 34. Said shanks 39 and 40 are yoked together by means of the vertically spaced apart connecting arms 41 and 42, thereby forming the opening 43. The rocker arm 44, which operates the intake valve 20, occupies a seat on the shaft 35 between the rocker arm shanks 39 and 40.

Rocker arms 34 and 44 are operatively related to the conventional type push rods 45 through the medium of the adjusting screws 46 and lock nuts 47 whereby their tappet clearance is regulated. Push rods 45 are shown as passing through pipes 48 in the exhaust chamber 49, and are operated in the well known manner from a camshaft. The exhaust chamber 49 communicates with a passage 50 extending circumferentially around the exhaust valve, said chamber being provided with an exhaust opening 51 through which the gases are finally discharged from the engine.

During the operation of the exhaust valve the inlet valve 20 remains seated, as shown at the left in Fig. 3, through the resistance of the spring 27, said spring in turn returning the exhaust valve to its seat 7 when said rocker arm fingers 32 and 33 cease to act upon said rods 30 and 31. Thus the gases are forced through the relatively large annular exhaust port 16 into the exhaust passage 50 extending around each exhaust valve and connected with the exhaust chamber 49, thereby relieving back pressure in the cylinder 2. Springs 27 and 34 are always in compression and act against each other to force the valves 13 and 20 apart, but spring 27 is of greater strength than spring 34, consequently it is not overcome thereby.

What is claimed is:

1. In a device of the kind described, a cylinder block including a piston cylinder, a cylinder head including a valve chamber, an annular combustion chamber member provided with an inwardly directed peripheral flange at one end, said flange having formed in its inner face an annular seat for a valve, means to operatively relate said piston cylinder and said valve chamber with said annular member interposed therebetween, said valve chamber including an annular sleeve, one end of said sleeve forming with the peripheral portion of said inwardly directed flange an annular exhaust port, an annular exhaust valve provided with an inwardly directed flange at one end and an outwardly directed peripheral flange at its other end slidably mounted in said annular sleeve with the outer face of said outwardly directed flange underlying said annular seat adapted to open and close said port, means to reciprocate said exhaust valve in said sleeve to open and close said port, said means including pairs of plunger rods constructed and arranged to engage said inwardly directed flange of said exhaust valve at diametrically opposite points, a closure for the end of said valve chamber opposite said annular valve seat, said closure including guides through which said plunger rods are vertically reciprocable, means to operate said pairs of plunger rods in unison, said means comprising yoked rocker arms simultaneously engaging said plunger rods, a rocker arm shaft upon which said yoked rocker arms are operatively related, said outwardly directed flange of said exhaust valve being provided with an annular valve seat in the periphery thereof adjacent its interior annular wall, an intake valve seatable upon said seat to open and close the opening in the exhaust valve which communicates with said interpositioned annular member, said intake valve having a stem, a compression spring coiled about said stem and acting in opposition to said plunger rods to maintain the exhaust valve closed, one end of said spring abutting the inwardly directed flange of said exhaust valve and the other end abutting said intake valve, a valve guide in said closure for the stem of said intake valve, means operatively related to said stem exteriorly of said closure to operate said intake valve, said means for operating said intake valve including a rocker arm mounted upon said rocker arm shaft and occupying a position thereon in the opening provided between the yoked rocker arms which actuate said plunger rods, and a push rod to which said intake rocker arm is operatively related to actuate the latter.

2. In a device of the kind described, a cylinder head containing a valve chamber having a fuel intake opening and a fuel discharge end, an annular exhaust valve mounted within said chamber and provided with an inwardly directed peripheral flange at one end and with an outwardly directed peripheral flange at its opposite end, the first recited end being located in the mid-length position of said valve chamber and comprising the fuel intake end and the second recited end comprising the fuel discharge end and projecting beyond the fuel discharge end of said valve chamber, an annular valve seat in the inner periphery of said outwardly directed flange, an intake valve positioned for opening and closing said fuel discharge end of said exhaust valve, a bearing including a valve guide provided with an opening, said bearing closing the end of said valve chamber opposite to its discharge end, said intake valve being provided with a stem extending through said valve guide opening, two additional guides in said bearing provided with openings, said openings in said two additional guides being diametrically spaced apart and adapted to overlie in a vertically spaced relation the inwardly directed flange of said exhaust valve, plunger rods mounted to vertically reciprocate in said diametrically spaced apart guides with their inner ends freely engaging said inwardly directed flange of said exhaust valve and their opposite ends projecting freely beyond said guide means, a rocker arm provided with spaced apart fingers to engage the free ends of said rods to actuate said exhaust valve in one direction, and yieldable means acting between said rocker arm's fingers and said bearing automatically to move said exhaust valve in the opposite direction.

3. In a device of the kind described, a cylinder block including a piston cylinder, a cylinder head including a valve chamber, a separate annular member provided with an inwardly directed peripheral flange at one end, said flange having formed in its inner face an annular seat for a valve, means to operatively relate said cylinder block and said cylinder head with said annular member interposed therebetween in axial alinement with said cylinder and said valve chamber, said valve chamber including an annular sleeve, one end of said sleeve forming with the peripheral portion of said inwardly directed flange an annular exhaust port, an annular exhaust valve provided with an inwardly directed flange at one end and an outwardly directed peripheral flange at its other end slidably mounted in said annular sleeve with the upper face of said outwardly directed flange underlying said annular seat and positioned to open and close said port, and means to reciprocate said exhaust valve in said sleeve to open and close said port, said means including pairs of plunger rods constructed and arranged to engage said inwardly directed flange of said exhaust valve at diametrically opposite points, and a bearing for closing said valve chamber including guides through which said plunger rods are vertically reciprocable.

4. The subject matter of claim 3 and, said outwardly directed flange of said exhaust valve being provided with an annular valve seat in the periphery thereof adjacent its interior annular wall, an intake valve mounted upon said cylinder head and seatable upon said seat to open and close the opening in the exhaust valve which communicates with said interpositioned annular member, said intake valve having a stem, a compression spring coiled about said stem and acting in opposition to said plunger rods to maintain the exhaust valve closed, one end of said spring abutting the inwardly directed flange of said exhaust valve and the other end abutting said intake valve, a valve guide in said bearing for the stem of said intake valve, and means operatively related to said stem exteriorly of said bearing to operate said intake valve.

5. In an internal combustion engine, a cylinder block including a cylindrical piston chamber the axis of which extends vertically, said chamber opening out at the top of said block, an annular combustion chamber member on top of said block encircling the upper end of said piston chamber, the upper end of said member having an inwardly directed peripheral flange, said flange having formed along its inner periphery an annular valve seat, a cylinder head having a basal portion which surrounds said combustion chamber member and rests upon the top of said cylinder block, portions of said cylinder head being in a superimposed relation to said combustion chamber member, means to secure said cylinder head to said cylinder block, said cylinder head containing a vertically elongated valve chamber in a central, superjacent relation to the combustion chamber within said combustion chamber member, there being an annular exhaust port surrounding the lower end of said valve chamber, said exhaust port being circumscribed by said peripheral flange of said combustion chamber member, an annular exhaust valve vertically slidable within said valve chamber and having a lower end portion which opens and closes said exhaust port and which is provided with a downwardly and inwardly directed valve seat which extends around it, an intake valve mounted upon said cylinder head and movable downwardly from and upwardly against the last recited valve seat, and mechanical means mounted upon the engine and operatively connected with said valves to operate them in proper sequence, said combustion chamber member being composed of a metal more resistant to the force of the explosion than is the metal of the members between which it is interposed.

CLARENCE P. BRUMBY.